(12) United States Patent
Dorwin

(10) Patent No.: US 10,645,430 B2
(45) Date of Patent: May 5, 2020

(54) REDUCING TIME TO FIRST ENCRYPTED FRAME IN A CONTENT STREAM

(71) Applicant: GOOGLE LLC, Mountain View, CA (US)

(72) Inventor: David Kimbal Dorwin, Kirkland, WA (US)

(73) Assignee: GOOGLE LLC, Mountain View, CA (US)

( * ) Notice: Subject to any disclaimer, the term of this patent is extended or adjusted under 35 U.S.C. 154(b) by 323 days.

(21) Appl. No.: 15/616,417

(22) Filed: Jun. 7, 2017

(65) Prior Publication Data

US 2017/0270306 A1 Sep. 21, 2017

Related U.S. Application Data

(63) Continuation of application No. 13/654,271, filed on Oct. 17, 2012, now Pat. No. 9,697,363.

(Continued)

(51) Int. Cl.
*H04L 29/06* (2006.01)
*H04N 21/2347* (2011.01)
(Continued)

(52) U.S. Cl.
CPC ..... *H04N 21/2347* (2013.01); *G06F 11/3003* (2013.01); *G06F 17/2247* (2013.01);
(Continued)

(58) Field of Classification Search
CPC ..... H04L 9/32; H04L 29/06027; H04L 65/80; H04L 2463/103; H04N 21/4516; H04N 21/41407
(Continued)

(56) References Cited

U.S. PATENT DOCUMENTS

| 4,535,355 A | 8/1985 | Arn et al. |
| 4,694,489 A | 9/1987 | Frederiksen |

(Continued)

FOREIGN PATENT DOCUMENTS

| EP | 0658054 | 6/1995 |
| EP | 0714204 | 5/1996 |

(Continued)

OTHER PUBLICATIONS

Shiguo Lian; Commutative Encryption and Watermarking in Video Compression; IEEE; vol. 17, No. 6, Jun. 2007; p. 774-778 (Year: 2007).*

(Continued)

*Primary Examiner* — Monjur Rahim
(74) *Attorney, Agent, or Firm* — Young Basile Hanlon & MacFarlane, P.C.

(57) ABSTRACT

Techniques are described for reducing time to decrypt a next encrypted frame in a content stream by optimizing a license/key acquisition process. When requesting content, a key identifier and/or license identifier may be included within a webpage using a link, script, or similar access point. When a client device sends a request for content, the loading of the webpage within the client device includes the embedded key identifier. Access to the key/license identifier at the client device then may initiate a key/license acquisition process by the client device. The key/license may be obtained from a key management device in parallel with, or prior to, downloading of at least a portion of the content stream.

18 Claims, 7 Drawing Sheets

Related U.S. Application Data

(60) Provisional application No. 61/569,755, filed on Dec. 12, 2011.

(51) Int. Cl.

| | | |
|---|---|---|
| *G06F 21/62* | (2013.01) | |
| *G06F 21/10* | (2013.01) | |
| *G06F 21/60* | (2013.01) | |
| *H04L 9/06* | (2006.01) | |
| *G06F 11/30* | (2006.01) | |
| *H04N 21/24* | (2011.01) | |
| *G06F 17/22* | (2006.01) | |
| *H04L 12/927* | (2013.01) | |
| *G06T 11/00* | (2006.01) | |
| *H04N 21/4405* | (2011.01) | |
| *H04N 21/258* | (2011.01) | |
| *H04N 21/45* | (2011.01) | |
| *G11B 20/00* | (2006.01) | |
| *H04L 9/32* | (2006.01) | |
| *H04N 21/414* | (2011.01) | |
| *G06F 21/50* | (2013.01) | |

(52) U.S. Cl.
CPC ............ *G06F 21/10* (2013.01); *G06F 21/105* (2013.01); *G06F 21/60* (2013.01); *G06F 21/602* (2013.01); *G06F 21/62* (2013.01); *G06F 21/6209* (2013.01); *G06T 11/00* (2013.01); *H04L 9/0631* (2013.01); *H04L 47/801* (2013.01); *H04L 47/805* (2013.01); *H04L 63/00* (2013.01); *H04L 63/0428* (2013.01); *H04L 63/06* (2013.01); *H04L 63/0876* (2013.01); *H04L 63/102* (2013.01); *H04L 65/4092* (2013.01); *H04L 65/602* (2013.01); *H04N 21/24* (2013.01); *H04N 21/4405* (2013.01); *G06F 21/50* (2013.01); *G06F 2221/0724* (2013.01); *G06F 2221/0759* (2013.01); *G11B 20/00086* (2013.01); *H04L 9/32* (2013.01); *H04L 29/06027* (2013.01); *H04L 65/80* (2013.01); *H04L 2209/603* (2013.01); *H04L 2463/101* (2013.01); *H04L 2463/103* (2013.01); *H04N 21/25825* (2013.01); *H04N 21/25833* (2013.01); *H04N 21/41407* (2013.01); *H04N 21/4516* (2013.01)

(58) Field of Classification Search
USPC ........................................................ 713/150
See application file for complete search history.

(56) References Cited

U.S. PATENT DOCUMENTS

| | | | |
|---|---|---|---|
| 5,067,035 A | 11/1991 | Kudelski et al. | |
| 5,134,656 A | 7/1992 | Kudelski | |
| 5,144,663 A | 9/1992 | Kudelski et al. | |
| 5,191,611 A | 3/1993 | Lang | |
| 5,339,413 A | 8/1994 | Koval et al. | |
| 5,375,168 A | 12/1994 | Kudelski | |
| 5,392,351 A | 2/1995 | Hasebe et al. | |
| 5,487,167 A | 1/1996 | Dinallo et al. | |
| 5,539,450 A | 7/1996 | Handelman | |
| 5,590,200 A | 12/1996 | Nachman et al. | |
| 5,592,212 A | 1/1997 | Handelman | |
| 5,621,799 A | 4/1997 | Katta et al. | |
| 5,640,546 A | 6/1997 | Gopinath et al. | |
| 5,666,412 A | 9/1997 | Handelman et al. | |
| 5,684,876 A | 11/1997 | Pinder et al. | |
| 5,758,257 A | 5/1998 | Herz et al. | |
| 5,774,527 A | 6/1998 | Handelman et al. | |
| 5,774,546 A | 6/1998 | Handelman et al. | |
| 5,799,089 A | 8/1998 | Kuhn et al. | |
| 5,805,705 A | 9/1998 | Gray et al. | |
| 5,870,474 A | 2/1999 | Wasilewski et al. | |
| 5,878,134 A | 3/1999 | Handelman et al. | |
| 5,883,957 A | 3/1999 | Moline et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,912,666 A | 7/1999 | Gladhill et al. | |
| 5,920,625 A | 7/1999 | Davies | |
| 5,920,861 A | 7/1999 | Hall et al. | |
| 5,922,208 A | 7/1999 | Demmers | |
| 5,933,498 A | 8/1999 | Schneck et al. | |
| 5,939,975 A | 8/1999 | Tsuria et al. | |
| 5,943,422 A | 8/1999 | Van Wie et al. | |
| 5,949,876 A | 9/1999 | Ginter et al. | |
| 5,982,891 A | 11/1999 | Ginter et al. | |
| 5,991,399 A | 11/1999 | Graunke et al. | |
| 6,009,116 A | 12/1999 | Bednarek et al. | |
| 6,009,401 A | 12/1999 | Horstmann | |
| 6,009,525 A | 12/1999 | Horstmann | |
| 6,021,197 A | 2/2000 | von Willich et al. | |
| 6,035,037 A | 3/2000 | Chaney | |
| 6,038,433 A | 3/2000 | Vegt | |
| 6,049,671 A | 4/2000 | Slivka et al. | |
| 6,055,503 A | 4/2000 | Horstmann | |
| 6,073,256 A | 6/2000 | Sesma | |
| 6,112,181 A | 8/2000 | Shear et al. | |
| 6,138,119 A | 10/2000 | Hall et al. | |
| 6,141,753 A | 10/2000 | Zhao et al. | |
| 6,157,721 A | 12/2000 | Shear et al. | |
| 6,160,891 A | 12/2000 | Al-Salqan | |
| 6,178,242 B1 | 1/2001 | Tsuria | |
| 6,185,683 B1 | 2/2001 | Ginter et al. | |
| 6,189,097 B1 | 2/2001 | Tycksen, Jr. et al. | |
| 6,191,782 B1 | 2/2001 | Mori et al. | |
| 6,226,618 B1 | 5/2001 | Downs et al. | |
| 6,226,794 B1 | 5/2001 | Anderson, Jr. et al. | |
| 6,237,786 B1 | 5/2001 | Ginter et al. | |
| 6,240,185 B1 | 5/2001 | Van Wie et al. | |
| 6,247,950 B1 | 6/2001 | Hallam et al. | |
| 6,253,193 B1 | 6/2001 | Ginter et al. | |
| 6,256,668 B1 | 7/2001 | Slivka et al. | |
| 6,272,636 B1 | 8/2001 | Neville et al. | |
| 6,285,985 B1 | 9/2001 | Horstmann et al. | |
| 6,292,569 B1 | 9/2001 | Shear et al. | |
| 6,298,441 B1 | 10/2001 | Handelman et al. | |
| 6,311,221 B1 | 10/2001 | Raz et al. | |
| 6,314,409 B2 | 11/2001 | Schneck et al. | |
| 6,314,572 B1 | 11/2001 | LeRocca et al. | |
| 6,334,213 B1 | 12/2001 | Li | |
| 6,363,488 B1 | 3/2002 | Ginter et al. | |
| 6,385,596 B1 | 5/2002 | Wiser et al. | |
| 6,389,402 B1 | 5/2002 | Ginter et al. | |
| 6,405,369 B1 | 6/2002 | Tsuria | |
| 6,409,080 B2 | 6/2002 | Kawagishi | |
| 6,409,089 B1 | 6/2002 | Eskicioglu | |
| 6,415,031 B1 | 7/2002 | Colligan et al. | |
| 6,427,140 B1 | 7/2002 | Ginter et al. | |
| 6,449,367 B2 | 9/2002 | Van Wie et al. | |
| 6,449,719 B1 | 9/2002 | Baker | |
| 6,459,427 B1 | 10/2002 | Mao et al. | |
| 6,466,670 B1 | 10/2002 | Tsuria et al. | |
| 6,505,299 B1 | 1/2003 | Zeng et al. | |
| 6,581,561 B1 | 7/2003 | Sered et al. | |
| 6,618,484 B1 | 9/2003 | Van Wie et al. | |
| 6,629,243 B1 | 9/2003 | Kleiman et al. | |
| 6,633,918 B2 | 10/2003 | Agarwal et al. | |
| 6,634,028 B2 | 10/2003 | Handelman | |
| 6,640,304 B2 | 10/2003 | Ginter et al. | |
| 6,651,170 B1 | 11/2003 | Rix | |
| 6,654,420 B1 | 11/2003 | Snook | |
| 6,654,423 B2 | 11/2003 | Jeong et al. | |
| 6,658,568 B1 | 12/2003 | Ginter et al. | |
| 6,668,325 B1 | 12/2003 | Collberg et al. | |
| 6,792,113 B1 | 9/2004 | Ansell et al. | |
| 6,957,350 B1 * | 10/2005 | Demos | H04N 5/14 348/E5.108 |
| 7,007,170 B2 | 2/2006 | Morten | |

(56) References Cited

U.S. PATENT DOCUMENTS

| | | | |
|---|---|---|---|
| 7,142,648 B1 * | 11/2006 | Miller | H04L 29/06027 379/88.23 |
| 7,165,175 B1 | 1/2007 | Kollmyer et al. | |
| 7,356,143 B2 | 4/2008 | Morten | |
| 7,640,435 B2 | 12/2009 | Morten | |
| 7,805,616 B1 | 9/2010 | Mohammed et al. | |
| 7,814,154 B1 | 10/2010 | Kandekar et al. | |
| 7,817,608 B2 | 10/2010 | Rassooi et al. | |
| 7,953,882 B2 | 5/2011 | Shukla et al. | |
| 8,687,114 B2 | 4/2014 | Bennett | |
| 8,787,454 B1 | 7/2014 | Chechik et al. | |
| 2002/0001385 A1 | 1/2002 | Kawada et al. | |
| 2002/0015498 A1 | 2/2002 | Houlberg et al. | |
| 2002/0021805 A1 | 2/2002 | Schumann et al. | |
| 2002/0049679 A1 | 4/2002 | Russell et al. | |
| 2002/0065844 A1 | 5/2002 | Robinson et al. | |
| 2002/0089410 A1 | 7/2002 | Janiak et al. | |
| 2002/0104004 A1 | 8/2002 | Couillard | |
| 2002/0141582 A1 | 10/2002 | Kocher et al. | |
| 2002/0170053 A1 | 11/2002 | Peterka et al. | |
| 2003/0007568 A1 | 1/2003 | Hamery et al. | |
| 2003/0016949 A1 | 1/2003 | Unger | |
| 2003/0046568 A1 | 3/2003 | Riddick et al. | |
| 2004/0028227 A1 | 2/2004 | Yu | |
| 2004/0031856 A1 | 2/2004 | Atsmon et al. | |
| 2004/0054857 A1 * | 3/2004 | Nowshadi | G06F 9/5011 711/153 |
| 2004/0093339 A1 | 5/2004 | Akune | |
| 2004/0117500 A1 | 6/2004 | Lindholm et al. | |
| 2004/0151315 A1 | 8/2004 | Kim | |
| 2004/0184616 A1 | 9/2004 | Morten | |
| 2004/0196972 A1 | 10/2004 | Zhu et al. | |
| 2005/0066353 A1 | 3/2005 | Fransdonk | |
| 2005/0125358 A1 | 6/2005 | Levin et al. | |
| 2005/0193205 A1 | 9/2005 | Jacobs et al. | |
| 2005/0273862 A1 | 12/2005 | Benaloh et al. | |
| 2006/0020811 A1 | 1/2006 | Tan | |
| 2006/0204115 A1 | 9/2006 | Burzaerovic | |
| 2006/0212363 A1 | 9/2006 | Peinado et al. | |
| 2006/0280150 A1 | 12/2006 | Jha et al. | |
| 2007/0160208 A1 | 7/2007 | MacLean et al. | |
| 2007/0209005 A1 | 9/2007 | Shaver et al. | |
| 2007/0219917 A1 | 9/2007 | Liu et al. | |
| 2007/0294170 A1 | 12/2007 | Vantalon et al. | |
| 2008/0027871 A1 | 1/2008 | Seo | |
| 2008/0147671 A1 | 6/2008 | Simon et al. | |
| 2008/0155673 A1 | 6/2008 | Jung et al. | |
| 2008/0313264 A1 | 12/2008 | Pestoni | |
| 2009/0007198 A1 | 1/2009 | Lavender et al. | |
| 2009/0031408 A1 | 1/2009 | Thom et al. | |
| 2009/0044008 A1 | 2/2009 | Lim | |
| 2009/0111479 A1 * | 4/2009 | Yamaguchi | H04W 76/11 455/450 |
| 2009/0147854 A1 | 6/2009 | Dane et al. | |
| 2009/0161874 A1 * | 6/2009 | Eun | H04L 12/2856 380/277 |
| 2009/0183001 A1 | 7/2009 | Lu et al. | |
| 2009/0185073 A1 | 7/2009 | MacInnis et al. | |
| 2009/0208016 A1 | 8/2009 | Choi et al. | |
| 2009/0249426 A1 | 10/2009 | Aoki et al. | |
| 2010/0023760 A1 | 1/2010 | Lee et al. | |
| 2010/0027974 A1 | 2/2010 | Ansari | |
| 2010/0145794 A1 | 6/2010 | Barger et al. | |
| 2010/0180289 A1 | 7/2010 | Barsook et al. | |
| 2010/0211776 A1 | 8/2010 | Gunaseelan et al. | |
| 2010/0242079 A1 | 9/2010 | Riedl et al. | |
| 2010/0242097 A1 | 9/2010 | Hotes et al. | |
| 2010/0299701 A1 | 11/2010 | Liu et al. | |
| 2011/0131664 A1 | 6/2011 | Jonsson | |
| 2011/0179283 A1 | 7/2011 | Thom et al. | |
| 2011/0194713 A1 | 8/2011 | Apfel et al. | |
| 2011/0225417 A1 | 9/2011 | Maharajh et al. | |
| 2011/0274179 A1 | 11/2011 | Holden | |
| 2011/0314284 A1 | 12/2011 | Chou | |
| 2012/0066494 A1 | 3/2012 | Lee et al. | |
| 2012/0117183 A1 | 5/2012 | Wong et al. | |
| 2012/0173884 A1 | 7/2012 | Patil | |
| 2012/0317414 A1 | 12/2012 | Glover | |
| 2012/0331293 A1 * | 12/2012 | Ma | H04L 9/0891 713/168 |
| 2013/0072126 A1 | 3/2013 | Topaltzas et al. | |
| 2013/0097302 A9 | 4/2013 | Khedouri et al. | |

FOREIGN PATENT DOCUMENTS

| | | |
|---|---|---|
| EP | 0852445 | 7/1998 |
| EP | 0886409 | 12/1998 |
| EP | 1134917 | 9/2001 |
| EP | 1246463 | 10/2002 |
| JP | 03203432 | 9/1991 |
| JP | 08335040 | 12/1996 |
| JP | 10336128 | 12/1998 |
| JP | 11175475 | 7/1999 |
| JP | 2000022680 | 1/2000 |
| JP | 2000196585 | 7/2000 |
| JP | 2000293945 | 10/2000 |
| JP | 2001251599 | 9/2001 |
| WO | WO/1996/006504 | 2/1996 |
| WO | WO/1996/032702 | 10/1996 |
| WO | WO/1999/021364 | 4/1999 |
| WO | WO/1999/028842 | 6/1999 |
| WO | WO/1999/030499 | 6/1999 |
| WO | WO/1999/054453 | 10/1999 |
| WO | WO/2001/035571 | 5/2001 |
| WO | WO/2001/093212 | 12/2001 |
| WO | WO/2002/021761 | 3/2002 |
| WO | WO/2004/002112 | 12/2003 |

OTHER PUBLICATIONS

"Getting Started: Background and Basics—The Chromium Projects", last updated Sep. 2, 2008, pp. 1-4, available at: https://www.chromium.org/nativeclient/getting-started/getting-started-background-and-basics, last accessed Jun. 27, 2016.

"High-bandwidth Digital Content Protection," Wikipedia, the free encyclopedia, last modified Nov. 14, 2012, 7 pages, http://en.wikipedia.org/w/index.php?title=High-bandwidth_Digital_Content_Protection&printable=yes.

"HTML5," Wikipedia, the free encyclopedia, http://en.wikipedia.org/wiki/HTMl5, 9 pages, created Nov. 16, 2006.

"Intelligent Systems for Finance and Business," Goonatilake, S. et al., eds., Chapters 2-10, 1995, pp. 31-173.

"Irdeto Access and Optibase create Strategic Alliance", Press Release, Irdeto Access, Dec. 14, 2000 pp. 1-4 http://www.irdetoaccess.com/press/0000041.htm.

"Irdeto Access and Optibase create Strategic Alliance", Press Release, Optibase, Dec. 14, 2000, pp. 1-2, http://www.optibase.com/html/news/December_14_2000.html.

"Media Source Extensions, W3C Editor's Draft 18," Dec. 2012, http://dvcs.w3.org/hg/html-media/raw-file/tip/media-source.html, 25 pages, created Jul. 11, 2011, current draft dated Dec. 18, 2012.

"Media Source Extensions," http://html5-mediasource-api.googlecode.com/svn/trunk/draft-spec/mediasource-draft-spec.html, 1 page, Jul. 11, 2011.

"MediaSource Extensions v0.3," editor A. Colwell, http://html5-mediasource-api.googlecode.com/svn/tags/0.3/draft-spec/mediasource-draft-spec.html, 14 pages, Mar. 13, 2012.

"Multimedia over Coax Alliance," Wikipedia, the free encyclopedia, http://en.wikipedia.org/wiki/Multimedia_over_Coax_Alliance, 4 pages, created Jun. 11, 2006.

"PlayReady," Wikipedia, the free encyclopedia, last modified Jan. 30, 2012, 2 pages http://en.wikipedia.org/w/index.php?title=PlayReady&printable=yes.

"Sandbox—The Chromium Projects," http://dev.chromium.org/developers/design-documents/sandbox, 8 pages, Sep. 2, 2008.

"Scalable Video Coding," Wikipedia, the free encyclopedia, last modified Sep. 10, 2012, 4 pages http://en.wikipedia.org/w/index.php?title=Scalable_Video_Coding&printable=yes.

(56) References Cited

OTHER PUBLICATIONS

"UltraViolet (system)," Wikipedia, the free encyclopedia, last modified Feb. 20, 2012, 5 pages http://en.wikipedia.org/w/index.php?title=UltraViolet_(system)&printable=yes.
"W3C HTML Working Group," http://www.w3.org/html/wg, 9 pages, May 9, 2007.
"Web Cryptography Working Group Charter," W3c Technology and Society domain, http://www.w3.org/2011/11/webcryptography-charter.html, 6 pages, Apr. 3, 2012.
"What is HDCP (high definition copy protocol)?" Digital Connection, 2005, 2 pages http://www.digitalconnection.com/FAQ/HDTV_12.asp.
Balthrop, J. et al., "Coverage and Generalization in an Artificial Immune System", In Proceedings of Generic and Evolutionary Computation Conference (GECCO), New York, New York, US, Jul. 9-13, 2002, pp. 1-8.
Barth, A. et al., "The Security Architecture of the Chromium Browser", Technical Report, Stanford University, 2008, pp. 1-10.
Blumenfeld, S.M., "Streaming Media—System Security," Broadcast Engineering Magazine, Oct. 2001, pp. 1-2.
Canadian Examiner Report for Application No. 2,559,323 dated May 6, 2008, 3 pages.
Cheng, H. C. H "Partial Encryption for Image and Video Communication", Department of Computing Science, University of Alberta, Fall 1998, pp. 1-87.
Cheng, H. et al., "Partial Encryption of Compressed Images and Videos", IEEE Transactions on Signaling Processing, vol. 48, No. 8, Aug. 2000, pp. 2439-2451.
Chromium Blog, "A New Approach to Browser Security: The Google Chrome Sandbox", last updated Oct. 2, 2008, pp. 1-5, available at: http://blog.chromium.org/2008/10/new-approach-to-browser-security-google.html, last accessed Jun. 27, 2016.
Coldwell, A., "Proposal for a MediaSource API that allows sending media data to a HTMLMediaElement," Jul. 11, 2011, pp. 1-11 http://lists.whatwg.org/pipermail/whatwg-whatwg.org/2011-July/032384.html.
Deitcher, D., "Secure Implementations of Content Protection (DRM) Schemes on Consumer Electronic Devices," Discretix, White Paper, May 2011, 17 pages.
Eskicioglu, A.M. et al., "An Overview of Multimedia Content Protection in Consumer Electronics Devices", SPIC, vol. 16 No. 7, Apr. 2001, pp. 681-699.
Ferrill, E. et al., "A Survey of Digital Watermarking", Feb. 25, 1999, 15 pages http://elizabeth.ferrill.com/papers/watermarking.pdf.
Forrest, S., "Research Projects," Dec. 2, 2003, pp. 1-3, http://www.cs.unm.edu/,about.forrest/projects.html.
Glazkov, D. "What the Heck is Shadow DOM?", http://glazkov.com/2011/01/14/what-the-heck-is-shadow-dom, 14 pages, Jan. 14, 2011.
Goodman, J. et alo. "Low Power Scalable Encryption for Wireless Systems", Wireless Networks, No. 4, 1998, pp. 55-70.
Griwodz, C., "Video Protection by PartialContent Corruption", Multimedia and Security Workshop at ACM Multimedia, Bristol, UKL, Sep. 1998, pp. 1-5.
Griwodz, C. et al., "Protecting VoD the Easier Way", ACM Multimedia, Bristol, UK, Jan. 1998, pp. 21-28.
Hunter, J., et al., "A Review of Video Streaming Over the Internet", DSTC Technical Report TR97-10, Aug. 1997, pp. 1-28.
International Search Report & Written Opinion dated Sep. 11, 2007 in International Patent Application No. PCT/US2007/062055.
Kirovski, D. et al, "Digital Rights Management for Digital Cinema", Proceedings of the SPIE, Bellingham, VA, vol. 4472, Jul. 31, 2001, p. 105-120.
Metz, C., "Google Native Client: The web of the future—or the past?" The Register, http://www.theregister.co.uk/2011/09/12/google_native_client_from_all_sides/print.html, 13 pages, Sep. 12, 2011.
Notice of Allowance dated Mar. 1, 2017 in U.S. Appl. No. 13/654,271.
NTT Corporation, "Establishing Interconnectivity Among Various Makers' Products through Standardization of VOD Protocol", last updated Sep. 27, 2002, pp. 1-5, available at: http://www.ntl.co.jp/news/news02e/0209/020927.html, last accessed Jun. 27, 2016.
Office Action dated Jan. 4, 2016 in U.S. Appl. No. 13/654,271.
Office Action dated Apr. 13, 2007 in Chinese Patent Appilcation No. 2004800071571.
Office Action dated May 9, 2014 in U.S. Appl. No. 13/654,271.
Office Action dated Jan. 26, 2006 in EU Patent Application No. 05250968.4.
Office Action dated Oct. 23, 2013 in U.S. Appl. No. 13/532,734.
Office Action dated Oct. 23, 2013 in U.S. Appl. No. 13/654,237.
Office Action dated Oct. 24, 2013 in U.S. Appl. No. 13/654,271.
Office Action dated Nov. 7, 2013 in U.S. Appl. No. 13/712,764.
Office Action dated Nov. 13, 2013 in U.S. Appl. No. 13/437,789.
Office Action dated Dec. 26, 2013 in U.S. Appl. No. 13/586,664.
Office Action dated Mar. 26, 2013 in U.S. Appl. No. 13/437,789.
Office Action dated May 22, 2007 in EU Patent Application No. 04757582.4.
Office Action dated Jun. 20, 2013 in U.S. Appl. No. 13/586,664.
Office Action dated Aug. 14, 2013 in U.S. Appl. No. 13/437,789.
Omneon Video Networks Product Announcement, "Broadband Streaming—Omneon and BSkyB", TB-1006-1, created 2002, pp. 1-4.
Schulzrinne, H., et al., "Real Time Streaming Protocol (RTSP)," RFC 2326, Apr. 1998, pp. 1-86.
Schulzrinne, H., et al., "RTP: A Transport Protocol for Real-Time Applications", RFC 1889, Jan. 1996, pp. 1-75.
Search Report for European Patent Application No. 05250968.4 dated Oct. 12, 2005.
Spanos, G. et al., "Performance Study of a Selective Encryption Scheme for the Security of Networked, Real-Time Video", Proceedings of the Fourth International Conference on Computer Communications and Networks, ICCN '95, Las Vegas, NV, Sep. 1995, pp. 2-10.
Supplementary European Search Report for European Patent Application No. 00986215 dated Nov. 14, 2005.
Supplementary European Search Report for European Patent Application No. 04757582.4 dated Nov. 20, 2006.
Teixeira, L.M. et al, "Secure Transmission of MPEG Video Sources", Proceedings of IEEE Workshop on ISPACS, Nov. 6, 1998, pp. 1-5.
W3C, "Encrypted Media Extensions, W3C Editor's Draft Dec. 17, 2012", last updated Dec. 17, 2012, pp. 1-32, available at: http://dvcs.w3.org/hg/html-media/raw-file/tip/encrypted-media/encrypted-media.html, last accessed Jun. 27, 2016.
Wikipedia, "Conditional Access", last updated May 20, 2016, pp. 1-8, available at: http://en.wikipedia.org/wiki/Conditional_access, last accessed Jun. 27, 2016.
Wikipedia, "Digital Rights Management," last updated Jun. 27, 2016, pp. 1-30, available at: http://en.wikipedia.org/w/index.php?title=Digital_rights_management&printable=yes, last accessed Jun. 27, 2016.
Wikipedia, "Google Native Client" last updated Jun. 26, 2016, pp. 1-6, available at: http://en.wikipedia.org/wiki/Google_Native_Client, last accessed Jun. 27, 2016.
Wu, T-L et al., "Selective Encryption and Watermarking of MPEG Video (Extended Abstract)", submitted to International COnference on Image Science, Systems, and Technology, Feb. 17, 1997, 10 pages.
Yee, B. et al., "Native Client: A Sandbox for Portable, Untrusted x86 Native Code," IEEE Symposium on Security and Privacy, Oakland 2009, 15 pages, May 16-19, 2009.
Yoshida, K. et al., "A Continuous-Media Communication Method for Minimizing Playback Interuptions", IS&T/SPIE Conference on Visual Communications and Image Processing, San Jose California, vol. 3653, Jan. 1999, 10 pages.
Zhang, J. et al., "A Flexible Content Protection System for Media-On-Demand", Proceedings of the Fourth International Symposium on Multimedia Software Engineering 2002, Dec. 11-13, 2002, Piscataway, NJ, Dec. 11, 2002, pp. 272-277.
Notice of Allowance dated Jul. 19, 2012 in U.S. Appl. No. 13/553,630.
Office Action dated Jun. 3, 2015 in U.S. Appl. No. 13/654,271.

* cited by examiner

REDUCING TIME TO FIRST ENCRYPTED FRAME IN A CONTENT STREAM

CROSS-REFERENCE TO RELATED APPLICATIONS

This application is a continuation of U.S. patent application Ser. No. 13/654,271, filed Oct. 17, 2012, which claims the benefit of U.S. Provisional Patent Application No. 61/569,755, filed Dec. 12, 2011, each of which is hereby incorporated by reference herein in its entirety.

TECHNICAL FIELD

The present embodiments relate generally to managing play of digital content and, more particularly, but not exclusively, to reducing time to decrypting of at least a first encrypted frame in a content stream, in part, by performing a key acquisition process in parallel with or prior to a webpage load process for accessing of a content stream.

BACKGROUND

Movies, music, and other forms of digital content are provided to our computers over the Internet virtually everyday. We receive news, education, and entertainment, as well as many other forms of digital content. However, for a variety of reasons, some of this content is protected. Such protections may take the form of requiring a license that at least identifies various rights to use, play, copy, and/or distribute the associated content. Other protections may include various levels of types of encryption protection that may necessitate a key in order to decrypt the content. However, it may also be the case that the content is either partially protected or not protected at all. Thus, many of today's systems download the content, before they are able to determine whether a key or license is required. Based on this determination, a key and/or license acquisition process may then be performed. These actions, plus downloading the content stream and decompressing the content stream, often means that the consumer waits for some period of time before the requested content may start to play on his or her client device. This delayed time, is sometimes known as a time to first frame for play of the content. This time to first frame may in some instances be such that the consumer becomes frustrated waiting for the content to play. When consumers become frustrated, they may elect not continue to request the content, resulting in possible lose of revenue for content providers, advertisers, or the like. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION

Figure 1:
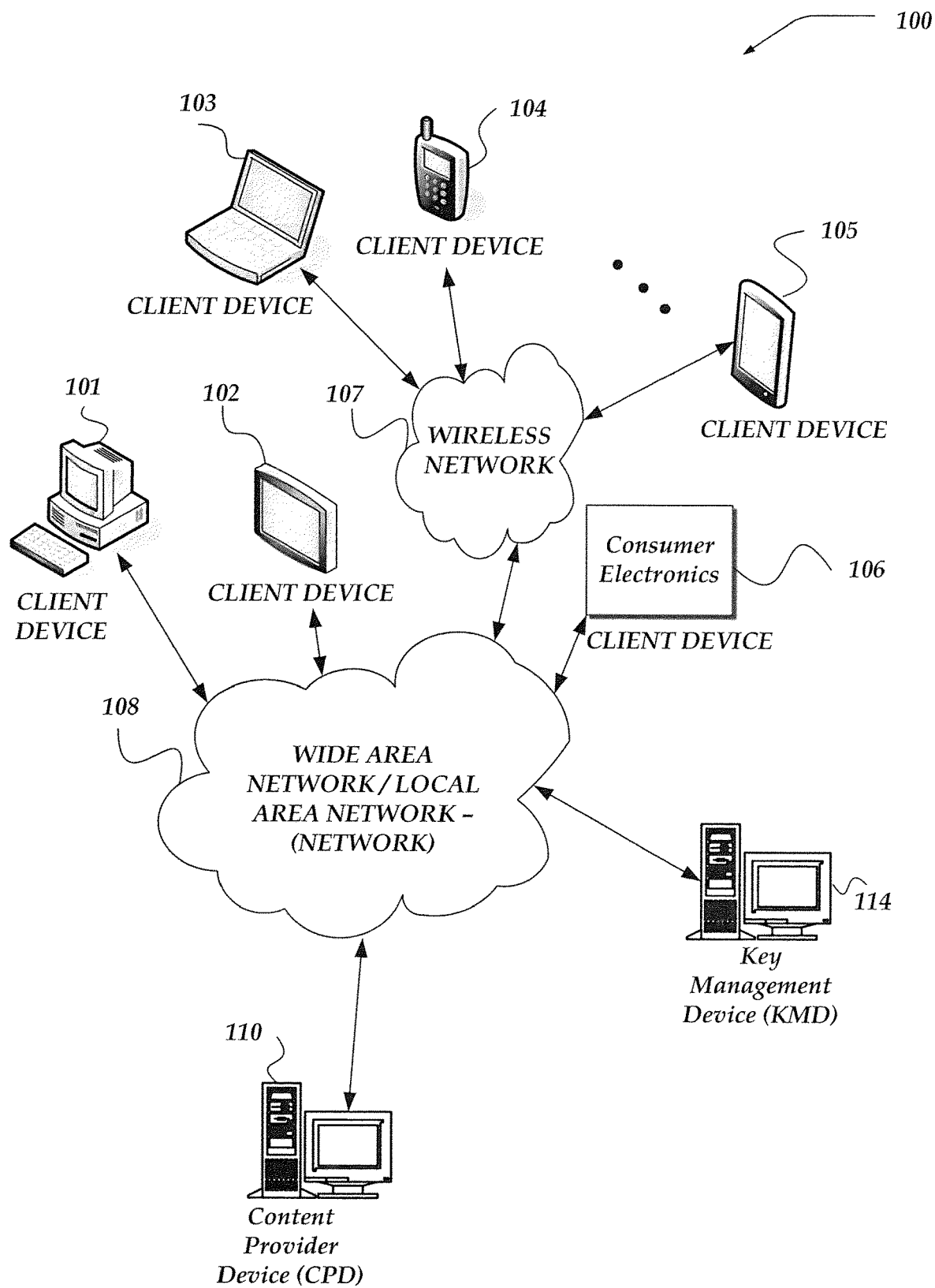
FIG. 1 illustrates a system diagram of one embodiment of an environment in which the embodiments may be practiced.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" includes any digital data that may be communicated over a network to be remotely played by a computing device. Non-exhaustive examples of content include but are not limited to movies, videos, music, spoken word, pictures, illustrations, graphics, images, text, and the like. Content is often described by its format, or container, in which the content is provided. Thus, as used here, the term "container" refers to a data stream or file format which encapsulates audio and visual content. This content often consists of interleaved audio and video data in frames, with accompanying metadata such as frame timing information, audio and/or video configuration information, encoding information, compression information, and the like. Also, the container is typically arranged to enable content to be presented for playback at a remotely located network device, such as a client device. A container may also be named a "systems stream". A non-limiting and non-exhaustive list of examples of container/system streams formats are: MPEG2-TS (Moving Picture Experts Group ("MPEG") transport stream ("TS")), flash video ("FLV"), MOV (a QuickTime file format), MP4, 3GP, and ASF (Advanced Systems Form), WebM Project file format, Matroska multimedia container format, or the like. A video encoding format, such as H.264, VP8, or the like, may be encapsulated in the container. The content may be distributed as a rights managed systems stream of data over a network such as Pay per View (PPV), Video On Demand (VoD), live streaming, or the like for playback by a remote network device. In one embodiment, the content may be protected through a license that describes how, where, when, by whom, or so forth, content that is protected may be accessed, distributed, copied, or the like. Protected content may be protected using a variety of content protection mechanisms.

As used herein, the term "streaming digital content" refers to digital content constantly received by and prepared for presentation for play at a client device while being delivered by a provider, typically over a network such as the Internet. With streaming, the client device can start playing the digital content before the entire content stream has been transmitted/received at the client device.

As used herein, encryption refers to the process of transforming digital content (referred to as plaintext) using an algorithm (called a cipher) to make it unreadable to anyone except those possessing special knowledge, usually referred to as a key. Decryption is the process of converting encrypted digital content back into its original form. As used herein, "unencrypted" digital content refers to digital content received in plaintext—or is otherwise not encrypted, and therefore does not need to be decrypted. It should be understood such plaintext digital content, may be received, in at least one embodiment, in a compressed form, or encoded form, and still be considered as plaintext for the purposes described herein. Moreover, as discussed further below, digital content may include portions that are encrypted, and other portions that are unencrypted within a same stream of digital content. Further, different encrypted portions of the stream of digital content may be encrypted using different encryption keys, and/or employ different licenses. In one embodiment, keys usable for decrypted the differently encrypted digital content may be rotated, reused, or renegotiated.

As used herein, the term "key/license" indicates that a key and/or a license are being referenced. Thus, "key/license" may be interpreted as "at least one of a key or a license." Further, a key/license identifier is to be read as at least one of a key identifier or a license identifier. Similarly, references to "key(s)," "license(s)," "identifier(s)," or the like, indicate that one or more of the item is referenced. That is, one or more keys, one or more licenses, or one or more identifiers, or the like.

The following briefly provides a simplified summary of the subject innovations in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, subject innovations are directed towards reducing an amount of time to decrypting of at least a first encrypted frame in a content stream by optimizing a license/key acquisition process. In one embodiment, rather than waiting for a media player or similar component within a client device to detect that content is encrypted, or otherwise, before the client device determines that a key/license is needed, the key/license is obtained at a same time as, in parallel with, before, or interspersed with a download of the content stream. This may be accomplished using one or more mechanisms. In one embodiment, initiating a license/key acquisition process may occur when a webpage is loaded into a client application from a content provider. That is, in one embodiment, the content provider may elect to manage key information, and when the content provider prepares and writes a webpage to a client device's browser, or other application, the webpage may include a link, script, or similar access point that includes an embedded key identifier and/or license identifier. When a client device sends a request for content, the loading of the webpage to the client device includes the embedded key/license identifier(s). Access to the key/license identifier at the client device may then initiate a key/license acquisition process by the client device.

As noted above, the subject innovations are not constrained to reducing an amount of time to decrypting of a first encrypted frame in a content stream. Times to decrypt other encrypted frames within the content stream may also be reduced, even where the other frames are not the first encrypted frame. Thus, for example, times to decryption of frames encrypted with a different key based on key rotations may also be reduced, as well as other seek points, bookmarked points or the like. Thus, as used herein, the term "first encrypted frame" is not to be construed as being limited to a physical first encrypted frame, and includes other encrypted frames within the content stream as well.

In another embodiment, the key may be obtained from a key management device in parallel to downloading of the webpage, such that the key/acquisition process might be initiated prior to or in parallel with downloading of at least a portion of the content stream. In still another embodiment, a request for the license/key might be performed prior to requesting download of a portion of the content, in some situations a delay might be imposed on accessing the content to enable the key/license to be acquired. In yet another embodiment, the key or license may be embedded in the webpage, script, or the like.

Where different keys/licenses are employed to protect different portions of the content stream, in one embodiment, all of the keys/licenses might be requested during the initial key/license acquisition process. In another embodiment, the content provider's network device might monitor when a key/license rotation event is expected to occur during a content streaming process. The content provider's network device may then provide new key/license identifiers to the client device, through a script, markup language, application, or within the provided content stream, or using any of a variety of other mechanisms. Receipt of the key/license identifiers also includes indication of which frame within the content is to employ the next key/license. In this manner, the client device may again perform key/license acquisition requests prior to when the key/license is needed to decrypt a frame in the content stream.

The above mechanisms of providing key/license identifiers earlier in a content request process may be combined with a variety of other techniques as well. For example, in one embodiment, a first portion of the content stream might be unencrypted, and a second, later portion of the content stream may be encrypted. In this manner, a decryption key/license might not be needed to initiate play of the first frame of unencrypted content, thereby providing additional time to perform the key/license acquisition process.

In some embodiments, a decryption engine might also be loaded into memory of the client device prior to, or concurrent, with the above actions, such that the decryption engine is available to perform decryptions. In this manner, delays that might be incurred while waiting for the decryption engine to be readied to perform decryption may be minimized. As soon as the key(s)/license(s) are available by the client device, the decryption engine is ready to use them.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 108, wireless network 107, client devices 101-106, Content Provider Device ("CPD") 110, and Key Management Device (KMD) 114.

One embodiment of client devices 101-106 is described in more detail below in conjunction with FIG. 2. In one embodiment, at least some of client devices 101-106 may operate over a wired and/or a wireless network such networks 107 and 108. As shown, client device 101 may include virtually any computing device capable of communicating over a network to send and receive information, including instant messages, performing various online activities, or the like. The set of such devices may include devices that typically connect using a wired or wireless communications medium such as personal computers, multiprocessor systems, microprocessor-based or programmable consumer electronics, network PCs, or the like. Also, client device 102 may include virtually any device usable as a video display device, such as a television, display monitor, display screen, projected screen, and the like. Additionally, client device 106 may include any kind of Consumer Electronic device, e.g., a Blu-ray player, DVD player, CD player, portable music playing device, portable display projector, and the like. Moreover, client devices 101-106 may provide access to various computing applications, including a browser, or other web-based application.

Generally, however, client devices 101-106 may include virtually any portable computing device capable of receiving and sending messages over a network, accessing and/or playing content, such as network 108, wireless network 107, or the like. Further, client devices 103-105 may include virtually any portable computing device capable of connecting to another computing device and receiving information such as, laptop computer 103, smart phone 104, and tablet computers 105, and the like. However, portable computer devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 101-106 typically range widely in terms of capabilities and features.

A web-enabled client device may include a browser application that is configured to receive and to send webpages, web-based messages, and the like. The browser application may be configured to receive and display graphics, text, multimedia, media content, and the like, employing virtually any Internet-based and/or network-based protocol, including but not limited to a wireless application protocol messages ("WAP"), Hypertext Transfer Protocol ("HTTP"), or the like. In one embodiment, the browser application is enabled to employ Handheld Device Markup Language ("HDML"), Wireless Markup Language ("WML"), WMLScript, JavaScript, or other scripting language, Standard Generalized Markup Language ("SGML"), HyperText Markup Audio Language ("HTML"), eXtensible Markup Language ("XML"), and the like, to display and send a message. In one embodiment, a user of a client device may employ the browser application to perform various activities over a network (online). However, another application may also be used to perform various online activities.

Client devices 101-106 also may include at least one other client application that is configured to receive and/or send content between another computing device. The client application may include a capability to send and/or receive content, or the like. The client application may further provide information that identifies itself, including a type, capability, name, and the like. In one embodiment, client devices 101-106 may identify themselves as part of a class of devices. In another embodiment, client devices 101-106 may uniquely identify themselves through any of a variety of mechanisms, including a phone number, Mobile Identification Number ("MIN"), an electronic serial number ("ESN"), Internet Protocol (IP) Address, network address, or other mobile device identifier. The information may also indicate a content format that the mobile device is enabled to employ. Such information may be provided in a network packet, or the like, sent between other client devices, CPD 110, or other computing devices. Moreover, it should be readily understood that devices and/or components within a device that is communicating with a client device may also identify themselves using any of a variety of mechanisms, including those used by the client device.

Client devices 101-106 may further be configured to include a client application that enables an end-user to log into an end-user account that may be managed by another computing device, such as CPD 110, or the like. Such end-user account, in one non-limiting example, may be configured to enable the end-user to manage one or more online activities, including in one non-limiting example, search activities, social networking activities, browse various websites, communicate with other users, or the like. In one embodiment, the end-user's client device may receive content streamed to the client device for play at the client device. However, participation in online activities may also be performed without logging into the end-user account.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 101-106. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 101-106 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-106 and another computing device, network, and the like.

Network 108 is configured to couple network devices with other computing devices, including, CPD 110, and through wireless network 107 to client devices 103-105. Network 108 is enabled to employ any form of network mechanism for communicating information from one electronic device to another. Also, network 108 can include the Internet in addition to LANs, WANs, direct connections, such as through a universal serial bus ("USB") port, other forms of network mechanism, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, network mechanisms by way of example, network mechanisms include wired media such as twisted pair, coaxial cable, fiber optics, wave guides, and other wired media and wireless media such as acoustic, RF, infrared, and other wireless media.

One embodiment of CPD 110 is described in more detail below in conjunction with FIG. 3. Briefly, however, CPD 110 includes virtually any network device usable to operate as a content server to connect to network 108 to provide content to client devices 101-106. In some embodiments, CPD 110 may provide a stream of digital content to a client device. In one embodiment, at least some portions of the at least one stream may be encrypted, while at least some other portions of the at least one stream may be unencrypted.

In some embodiments, CPD 110 may receive a request from a client device such as client devices 101-106. In some embodiments, the request might a request for a webpage that includes one or more selections for protected content. For example, the webpage might include selectable links to enable a user to select and access various protected content, such as movies, music, or the like. In one embodiment, the webpage might further enable a user to select one or more links that enable the user to obtain additional information about the protected content.

In some embodiments, when the user selects to access some of the protected content, CPD 110 may build a webpage that includes a link, script, or other mechanism that provide to the user's client device, a key identifier/license identifier or the like, prior to providing the requested content. In this manner, the client device may then use the key/license identifier(s) to initiate a key/license acquisition process prior to, or in parallel with, acquiring the requested content. In some embodiments, when the user selects to obtain more information about some of the protected content, a webpage may be provided in response that includes the key identifier/license identifier for the protected content. Again, receipt of the identifier(s) may initiate a key/license acquisition process by the client device or the webpage may direct the client device to initiate such process.

In still other embodiments, the webpage that CPD 110 initially provides to a client device for selecting protected content, may include a plurality of key identifiers/license identifiers, where each selected link to access each protected content item may include an associated key/license identifier (s). Each of the above various techniques are directed towards providing the client device with sufficient information to initiate a key/license acquisition request process prior to, or in parallel with, requesting/acquiring related protected content.

It should be readily recognized that CPD 110 is configured to operate on behalf of a content owner, distributor, or similar business entity. However, while used herein to represent such network devices usable to provide content, it is further recognized that other devices may also be employed. For example, a content provider may employ a Content Distribution Network Device (not shown) that operates on behalf of the content provider to provide content. Thus, other configurations and variations of devices serving content are also envisaged, and other embodiments are not constrained to a single configuration/arrangement of devices.

Devices that may operate as CPD 110 include various network devices, including, but not limited to personal computers, desktop computers, multiprocessor systems, microprocessor-based or programmable consumer electronics, network PCs, server devices, network appliances, and the like.

Although FIG. 1 illustrates CPD 110 as a single computing device, the invention is not so limited. For example, one or more functions of CPD 110 may be distributed across one or more distinct network devices. Moreover, CPD 110 is not limited to a particular configuration. Thus, in one embodiment, CPD 110 may contain a plurality of network devices to provide content, licenses, and/or decryption keys to a client device, such as client devices 101-106. Similarly, in another embodiment, CPD 110 may contain a plurality of network devices that operate using a master/slave approach, where one of the plurality of network devices of CPD 110 operates to manage and/or otherwise coordinate operations of the other network devices. In other embodiments, the CPD 110 may operate as a plurality of network devices within a cluster architecture, a peer-to-peer architecture, and/or even within a cloud architecture. Thus, the invention is not to be construed as being limited to a single environment, and other configurations, and architectures are also envisaged.

In one embodiment, CPD 110 may also be configured to manage license requests, and/or access to decryption keys usable to decrypt portions of the encrypted digital content by a client device for play based on the license. In other embodiments, KMD 114 is configured to provide the decryption keys/licenses.

It should be noted that the encrypted content may be encrypted using any of a variety of symmetric and/or asymmetric key technologies. For example, possible asymmetric keys technologies include, but are not limited to, Diffie-Hellman, RSA, Merkle-Hellman, PGP, X.509, elliptic curve techniques, ElGamal, or the like. Similarly, various possible symmetric key technologies include, but are not limited to, Twofish, Serpent, AES (Rijndael), Blowfish, CASTS, RC4, 3DES, and IDEA, to name just a few. Moreover, the content may be protected using a combination of symmetric and asymmetric key technologies. For example, a symmetric content decryption key might be used to encrypt/decrypt the content, and an asymmetric key technology might be used to encrypt/decrypt the content decryption key.

KMD 114 represents one of a variety of network devices for managing access to symmetric and/or asymmetric keys usable to enable access to protected content. In one embodiment, KMD 114 may operate to certify an ownership of a public key named within a digital certificate that provides a public key, where the public key is part of a public/private key associated with any of a variety of asymmetric key technologies. This allows others, such as CPD 110, or the like, to rely upon signatures or assertions made by the owner that corresponds to the public key that is certified. In one embodiment, KMD 114 may then operate as a trusted third party. Thus, in one embodiment, KMD 114 may operate as a Certification Authority, such as employed by many public key infrastructures (PKI) schemes. Further, KMD 114 may also provide Certificate Revocation Lists (CRLs) indicating when a public key/certificate is no longer valid, and might no longer be trusted/trustable.

In one embodiment, KMD 114 may receive a public key from a content provider, or the like, and based on various criteria, elect to make accessible the public key through a certificate that KMD 114 digitally signs. In one embodiment, access to the public key may enable an authorized client device to decrypt a content key that may then be used to decrypt at least a portion of the encrypted content.

In one embodiment, KMD 114 or CPD 110 might operate to negotiate a license and/or access to a key with client devices 101-106. In one embodiment, different content decryption keys might be used to encrypt different portions of a provided content. Thus, in one embodiment, multiple key negotiations may be performed for a given at least one content stream.

It should be understood, that while KMD 114 is illustrated as a separate device from CPD 110, in other embodiments, the functions of these devices may be integrated.

Although FIG. 1 illustrates KMD 114 as single computing devices, the invention is not so limited. For example, one or more functions of KMD 114 may be distributed across one or more distinct network devices. Moreover, KMD 114 is not limited to a particular configuration. Thus, in one embodiment, KMD 114 may contain a plurality of network devices. Similarly, in another embodiment, KMD 114 may contain a plurality of network devices that operate using a master/slave approach, where one of the plurality of network devices operates to manage and/or otherwise coordinate operations of the other network devices. In other embodiments, the KMD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
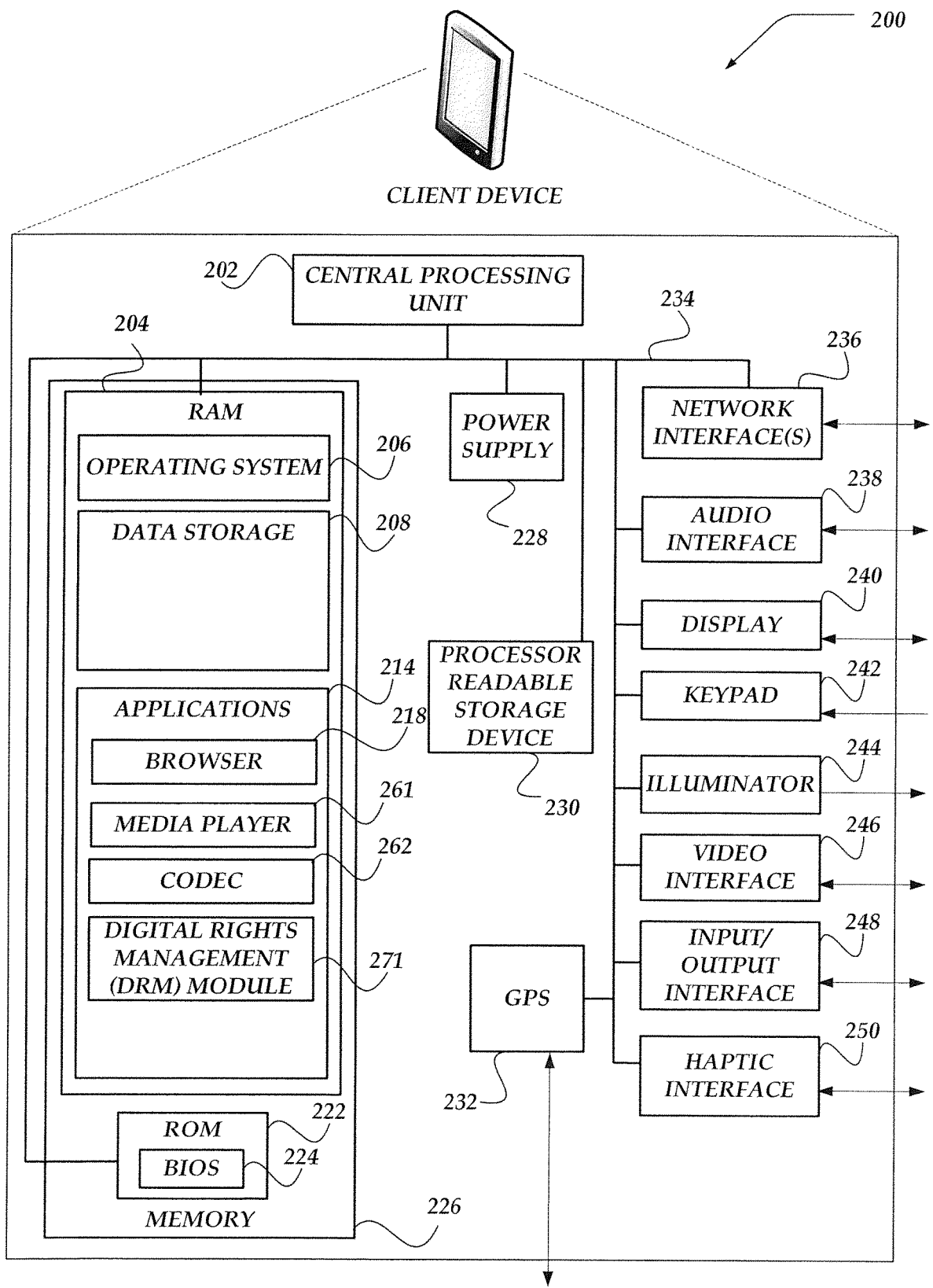
FIG. 2 illustrates one possible embodiment of a client device usable within the environment of FIG. 1.

FIG. 2 shows one embodiment of client device 200 that may be included in a system implementing the invention. Client device 200 may represent any of a variety of platforms usable to perform actions as disclosed within. Client device 200 may include many more or less components than those shown in FIG. 2. However, the components shown are sufficient to disclose an illustrative embodiment for practicing the present invention. Client device 200 may represent, for example, one embodiment of at least one of client devices 101-106 of FIG. 1.

As shown in the figure, client device 200 includes at least one central processing unit ("CPU") 202 (also called a processor, further, client device 200 may include more than one processor) in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and a global positioning systems ("GPS") receiver 232.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), Short Message Service ("SMS"), GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wired and/or wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include a touch sensitive screen arranged to receive input from an object such as a stylus or a digit from a human hand.

Moreover, display 240 may be configured to employ any of a variety of network connection types, including, but not limited to High-Bandwidth Digital Content Protection (HDCP) connection types, Display Port (DP), Digital Visual Interface (DVI), and High-Definition Multimedia Interface (HDMI), as well as Gigabit Video Interface (GVIF), Standard-definition (SD), Unified Display Interface (UDI), WiDi. At least some of these network connection types provide a form of digital copy protection. A detection of whether display 240 is connected through one of these, or other types, of network connection types may be determined using a variety of techniques, including signature transmissions, protocol handshakes, authentication procedures, or the like.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module, or other machine module, that enables control of hardware components and/or operating system operations via Java application programs, or other types of program scripts, or the like.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, webpage content, or any of a variety of user generated content. In one embodiment, data storage 208 may receive and store protected content, keys, key identifiers, licenses, and/or license identifiers. At least a portion of the information may also be stored on another component of network device 200, including, but not limited to computer readable storage device 230, a disk drive or other computer-readable storage device (not shown) within client device 200.

In some embodiments, data storage 208 may act as a buffer for content received from CPD 110 of FIG. 1. As noted above, it is recognized that providing of such content may also be performed by another device on behalf of CPD 110 of FIG. 1.

Applications 214 may include computer executable instructions which, when executed by client device 200, transmit, receive, and/or otherwise process messages (e.g., SMS, Multimedia Message Service ("MMS"), instant messages ("IM"), email, and/or other messages), audio, video, and enable telecommunication with another user of another client device. Other examples of application programs include calendars, search programs, email clients, IM applications, SMS applications, voice over Internet Protocol ("VOW") applications, contact managers, task managers, transcoders, database programs, word processing programs, security applications, spreadsheet programs, games, search programs, and so forth. Applications 214 may include, for example, browser 218, media player 261, Digital Rights Management (DRM) module 271, and Coder/Decoder (CODEC) 262 (also sometimes referred to as Compressor/Decompressor).

Browser 218 may include virtually any application configured to receive and display graphics, text, multimedia, and the like, employing virtually any web based protocol. In one embodiment, the browser application is enabled to employ HDML, WML, WMLScript, JavaScript, other scripting languages, SGML, HTML, XML, and the like, to display and send a message. However, any of a variety of other web-based programming languages may be employed. In one embodiment, browser 218 may enable a user of client device 200 to provide and/or receive content from another computing device, such as CPD 110 of FIG. 1. Although browser 218 is described herein, it should be noted that there are a plurality of other applications that may operate as a user agent configured to request and/or access content. Thus, other user agents may also be included within client device 200.

Media player 261 represents any of a variety of software and/or hardware configurations arranged to receive and play various content. As such, in one embodiment, media player 261 may also represent a hardware component that might be installed within client device 200 and/or coupled electrically to client device 200 to enable client device 200 to access and play content. In one embodiment, media player 261 may receive protected content from browser 218, and employ one or more of CODECs 261 and/or DRM module DRM 271 to enable play of the received protected content.

CODEC 262 includes any of a variety of compression/decompression (or coding/decoding) mechanisms configured to receive compressed content and decompress the content into a format capable of being rendered for the user's enjoyment. For example, CODEC 262 may employ Moving Pictures Experts Group (MPEG), Joint Photographic Experts Group (JPEG), wavelets, and/or any other mechanism that compresses content that may later be decompressed. Further, although CODEC 262 may include capabilities for graphical content, CODEC 262 may also be configured to receive audio content, and as appropriate, prepare the audio content for play by a media player as well. Thus, CODEC 262 may not be exclusive for graphical content, and may also operate on audio, graphical content, and/or content having a combination of audio and graphical information. In one embodiment, CODEC 262 may be configured to support a particular set of decoding (decompression) mechanisms. For example, CODEC 262 might be configured to support JPEG, but not H.264; in another embodiment, CODEC 262 is configured to support H.264, JPEG, but not VP8. It is noted that these are examples, and not to be construed as limiting, or exhaustive, and clearly CODEC 262 may be configured and/or constrained in a variety of ways, beyond or instead of these examples.

DRM module 271 represents any of a class of access control technologies that are configured to manage the digital access rights to protected content. In one embodiment, DRM module 271 may include a content decryption module (CDM) that is configured to receive one or more decryption keys and/or licenses, and to employ the decryption keys/licenses to decrypt at least a portion of the content and enable access to the content. In one embodiment, DRM module 271 might be configured to receive information indicating that content is protected with keys/licenses. DRM module 271 may then send a communications requesting the keys/licenses. In one embodiment, DRM module 271 might be configured to provide a communications towards a Key Management Device, such as KMD 114 of FIG. 1 to obtain the keys/licenses. DRM module 271 may then receive portions of the protected content from media player 261, browser 218, or another application. DRM module 271 may then employ the keys/licenses to decrypt the encrypted content and enable selected rights of use of the content. DRM module 271 may provide the decrypted content to media player 261, to output hardware, and/or to CODEC 262 to decode/decompress the decrypted content such that it may then be played by media player 261. In some embodiments, communications with DRM module 271 may be through another application (within applications 214), browser 218, or through a plug-in to browser 218, media player 261, or the like.

While FIG. 2 illustrates media player 261, CODEC 262, and DRM module 271 as separate applications from each other, it should be understood that other configurations may also be used. For example, media player 261 may operate as a plug-in application to browser 218. Further, one or more CODEC 262 may operate as plug-ins with media player 261, browser 218, or be part of DRM module 271. Further, DRM module 271 may also be plug-in(s) or component(s) within a media player, browser, or the like. Thus, the arrangement of components within FIG. 2 is not limiting, or exhaustive, and other arrangements may also be used.

In one embodiment, an application within browser 218 may be arranged to receive and manage webpage content that might include a key identifier and/or license identifier associated with content. In one embodiment, the application may be implemented within media player 261. In any event, in one embodiment, the application may receive and/or store key identifiers associated with protected content. In one embodiment, the key identifier may be tagged or otherwise identified with particular protected content. In this manner, the application may receive a plurality of key identifiers and/or license identifiers, and store them for later use.

As described in more detail below in conjunction with FIG. 4, the key identifier/license identifier may initiate the application, in some embodiments, to generate a key/license request that may be sent to DRM 271. In turn, DRM 271 may send a key/license request that may be sent towards, for example, KMD 114 of FIG. 1. In this manner, a key/license acquisition process may be initiated prior to, or concurrent with a receiving of associated protected content.

Illustrative Network Device

Figure 3:
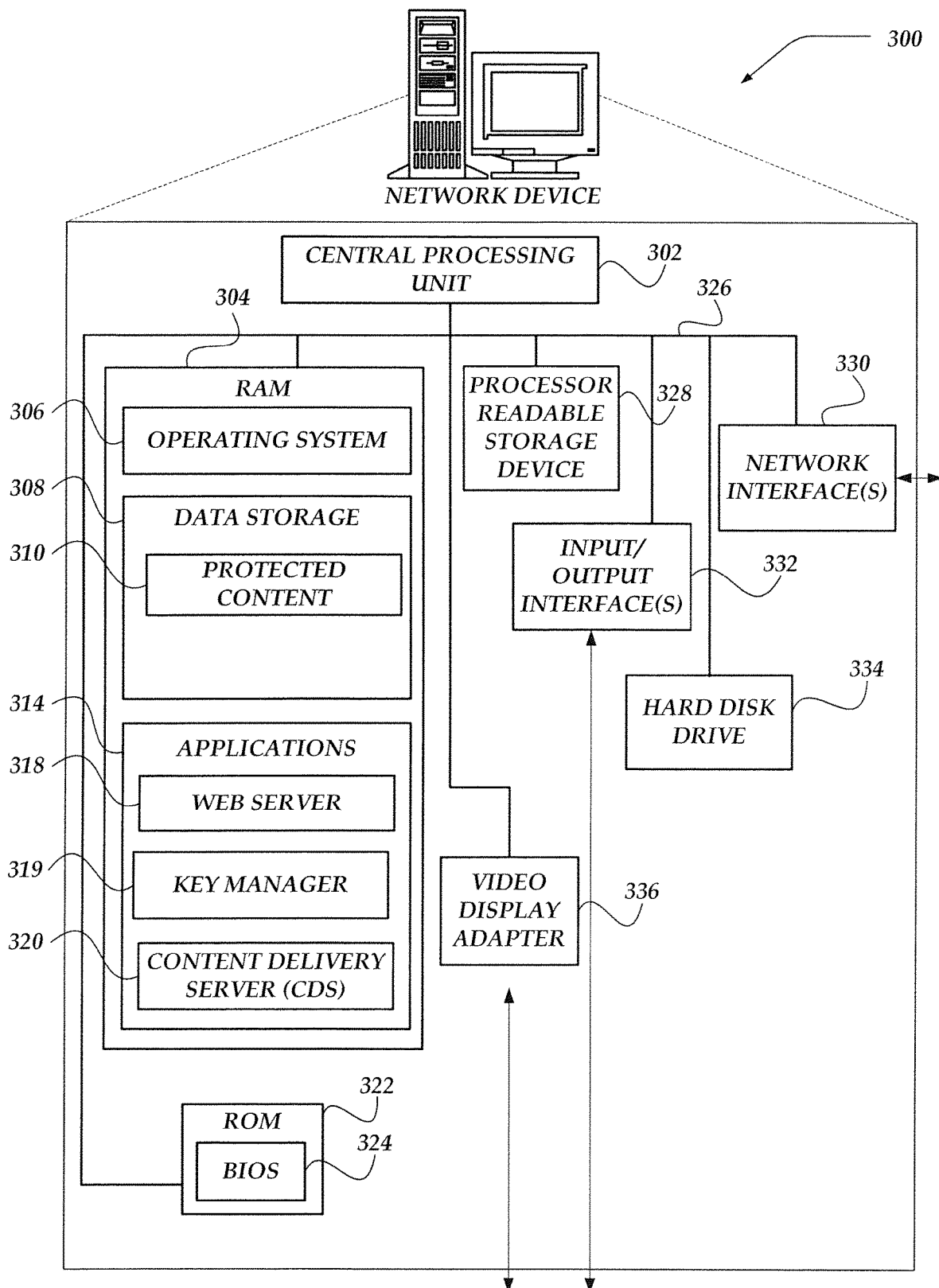
FIG. 3 illustrates one possible embodiment of a network device usable by a content provider within the environment of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, a client, a peer, a host, or any other device. Network device 300 may represent, for example CPD 110 of FIG. 1.

Network device 300 includes one or more central processing units (CPUs) 302 (also called a processor), computer readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent (non-transitory) mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (MC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical media which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to computer readable storage device 328, hard disk drive 334, or the like.

Data storage 308 may further store streams of protected content 310. Streams of protected content 310 represent any of a variety of content that may be protected from access using a license, encryption key, and/or the like. Data storage 308 may also include a table, spreadsheet, or other mechanism useable to associate key/license identifiers to protected content. For example, data storage 308 might include a table, or the like, that includes a content identifier that is associated with a key identifier and/or license identifier. When a webpage is built by network device 300 for delivery to a client device, the table or other mechanism may be used to construct and embed with information about the protected content the key/license identifier(s), as discussed in more detail below.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 318, key manager 319, and content delivery server 320, may also be included as application programs within applications 314.

Web server 318 represent any of a variety of services that are configured to provide content, including messages, over a network to another computing device. Thus, web server 318 includes, for example, a web server, an FTP server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like. Web Server 318 may also be configured to enable a user of a client device, such as client devices 101-106 of FIG. 1, to browse content, such as streams of protected content 310, and select content for display/play on the client device.

Key manager 319 is configured to manage negotiations of decryption keys and/or licenses for content streams. In one embodiment, key manager 319 may provide decryption keys and/or licenses to KMD 114 of FIG. 1. In other embodiments, key manager 319 may perform negotiations directly with a client device. In one embodiment, key manager 319 may select one or more content decryption keys for use in encrypting different portions of a content stream.

Key manager 319 may also be configured to revoke a license, and/or invalidate one or more decryption keys, based, for example, on an unauthorized request for a license, key, or even based on receiving an indication that an integrity of a requesting client device is determined to be compromised. In some embodiment, key manager 319 may further manage key identifiers, license identifiers, as well as decryption keys, and/or licenses.

Content Delivery Server (CDS) 320 is configured to manage access to streams of protected content 310. In one embodiment, the content may be protected through a license or licenses that may restrict when, where, and/or how content is accessed, distributed, or the like. In another embodiment, the content may be protected by being encrypted. In one embodiment, one portion of content may be encrypted using a first content encryption key; while another portion of the content may be encrypted using a second content encryption key. Thus, to decrypt the protected content, a user's client device may need access to a license that indicates how, where, and/or when the protected content may be accessed. The user's client device may also need access to one or more decryption keys usable to decrypt various portions of the protected content. In one embodiment, where multiple encryption keys are used to encrypt the content, a key rotation scheme may be employed, where the client device is provided an indication that the content is encrypted using a different key, and that the client device will have to use the different key. However, in another embodiment, the content may be protected by a license(s) and not be encrypted using encryption key(s).

In some embodiment, CDS 320 may operate in conjunction with web server 318 and key manager 319 to provide within a webpage key identifiers and/or license identifiers that may be provided to a client device.

General Operation

The operation of certain aspects of various embodiments will now be described with respect to FIGS. 4-7. FIG. 4 illustrates one possible embodiment of signal flow between various components within a client device to enable initiation of a key/license request prior to, or concurrent with receiving at least a first portion the protected content. Flow system 400 of FIG. 4 may include many more or less components than those shown. The components shown, however, are sufficient to disclose an illustrative embodiment for practicing the invention.

As shown, components below line 440 of FIG. 4 may reside within a client device, such as those illustrated in FIG. 1. Such components include, but are not limited by browser 218, media player 261, and DRM 271, each of which are discussed in more detail above in conjunction with FIG. 2. Components above line 440 may reside outside of a client device, and include, but are not limited to Content Provider device 110 and KMD 114, each of which are discussed in more detail above in conjunction with FIGS. 1 and 3. Also illustrated is one embodiment of a key ID store 402. Key ID store 402 may represent any form of data storage device, including but not limited to those discussed above in conjunction with data storage 308 of FIG. 3. As discussed above with respect to data storage 308, it should be understood that key ID store 402 may also include license identifiers. In one embodiment, key ID store 402 may include a table, spreadsheet, linked list, or any other mechanism that associated protected content to one or more key identifiers and/or one or more license identifiers. In some embodiments, the table or the like, may further include a Uniform Resource Locator (URL), or other form of tag, script, or the like, usable to provide the key/license identifiers within a webpage.

Figure 4:
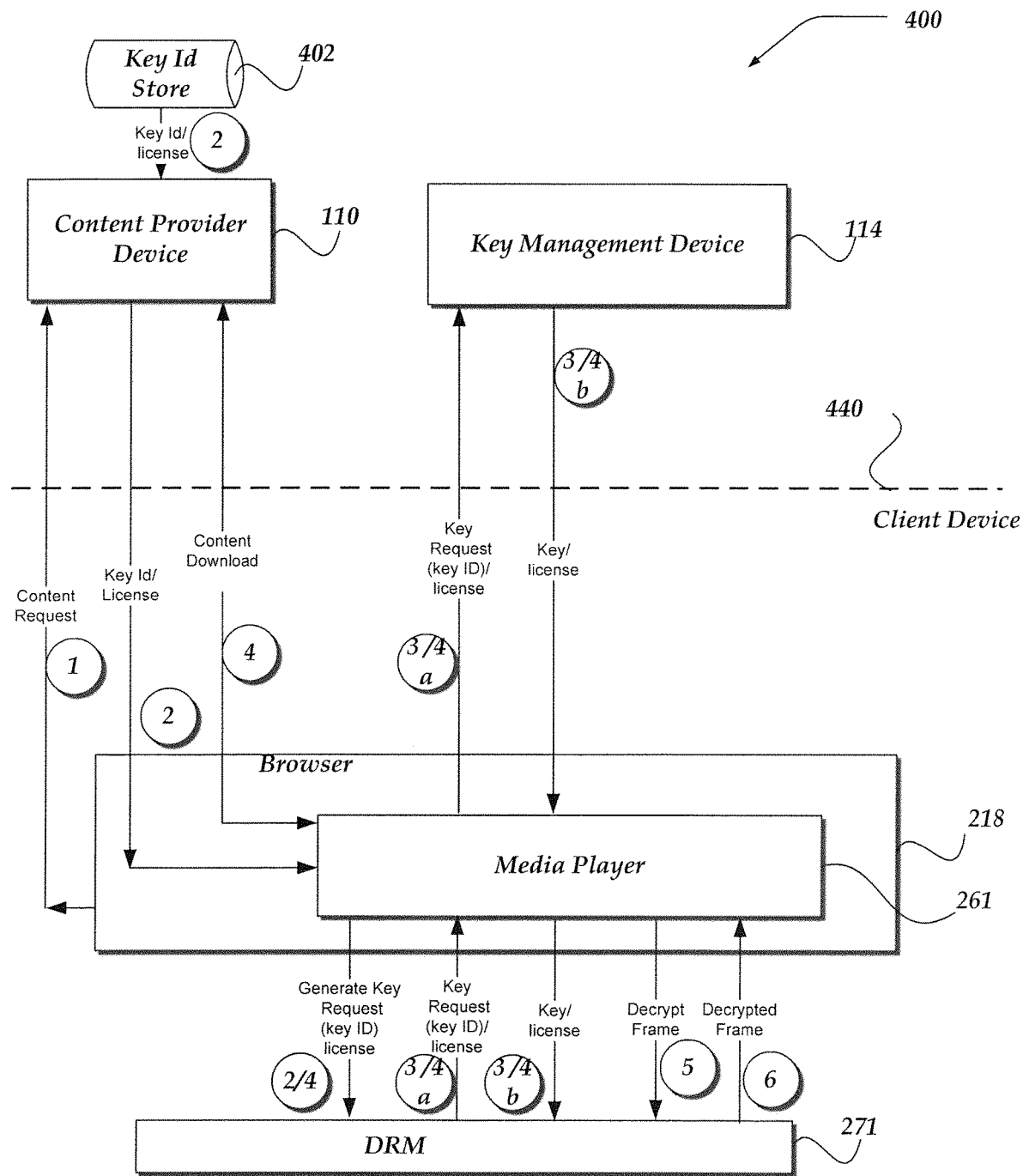
FIG. 4 illustrates one possible embodiment of signal flow between various components within a client device to enable initiation of a key/license request prior to, or concurrent with receiving at least a first portion the protected content.

Also illustrated within FIG. 4 are various flows of communications, content, or the like. It should be understood that these are merely examples and do not limit or otherwise narrow implementations of the techniques disclosed herein. For example, while not illustrated in FIG. 4, another application may intercept some of the communications shown, operate on the intercepted communications, and/or provide modified communications or new communications to another component. Further, while numbers next to the communication flows are intended to illustrate one embodiment of a sequence flow of the communication, other sequences may also be used. In any event, the techniques and sequences discussed herein are directed towards providing key/licenses prior to, or concurrent with, access to at least a portion of protected content, such that delays that might be incurred detecting that the received content is protected, and then sending requests for keys/licenses are minimized or eliminated by performing such acquisition processes earlier to content acquisition.

As illustrated in FIG. 4, a user may initiate a request for a webpage, communication 1, from a content provider such a CPD 110. In one embodiment, communication 1 may represent a request for a webpage that may include images or other information about one or more protected content item. For example, a user might access a webpage that displays information about a plurality of movies from which the user may select to download and play, and/or to be streamed, or otherwise accessed for play. Other examples are readily available, and thus, this example, is not met to be limiting. For example, in another embodiment, communication 1 might represent a request from a client device selecting one of the links to protected content. In still other embodiments, communication 1 might include a request for more information about a protected content item.

In any event, CPD 110 may receive the request, and employ information within key ID store 402 to build a response to the request that includes key identifier/license identifier information. In one embodiment, when the webpage is written to the client device, in communication 2, the webpage may have embedded therein, a key identifier/license identifier for the protected content. In some embodiment, the webpage might include a plurality of key identifiers/license identifiers for each of the displayed protected content items. In other embodiments, where a request might be for a particular protected content, the webpage might include key/license identifiers for the particular protected content. In some embodiments, where the content is protected using a key rotation scheme, where one portion of the content is protected by a different key/license than another portion of the content, multiple key/license identifiers might be included in the webpage. It should be noted that portions of the content may also include an audio portion, a language portion, an angle portion, as well as one or more frames of the content.

In one embodiment, a URL might be embedded in the webpage, where the URL includes the key/license identifiers as tags, encrypted portions of the address, or using any of a variety of other mechanisms, including a script, or the like.

When the client device receives communication 2, the key/license identifiers may be used to initiate a key acquisition process. That is, browser 218, media player 261, or another application (not shown) may send a generate key/license request in communication 2/4 to DRM 271. As used herein, the numbering x/y is used to merely suggest that the communications may be associated with communication x and/or communication y. For example, 2/4 indicates that the communication 2/4 may be associated with communication 2 and/or communication 4. DRM 271 may then generate a key/license request and send it towards KMD 114 in communication 3/4a. In some embodiments, communication 3/4a may be sent to an intervening component within the client device that may modify the communication and/or otherwise send the communication 3/4a onwards.

In some embodiments, concurrent with or after sending of communications 3/4a, at least a portion of the protected content may be provided to the client device in communication 4. In some embodiments, communications 4, the requested key/license, may also occur after communications 3/4b is received by the client device. It should be noted that in some embodiments, multiple keys/license identifiers may be received and/or requested during the above communications, as well as multiple keys/licenses being received in communications 3/4 b. Moreover, while single communication lines are illustrated, it should be clear that multiple communications may be represented by any of the single drawn lines. For example, communication 2 might include several communications being sent, rather than a single communications.

In any event, DRM 271 may receive the one or more keys/licenses in communications 3/4b, and employ one or more of the keys/licenses to respond to a request to decrypt content, communications 5, and provide decrypted content in response in communications 6. In some embodiments, communication 6 may instead flow towards a hardware device.

It should also be understood, as discussed further below, that during key rotation schemes, at least some of the illustrated communications, such as 2, 2/4, 3/4a and 3/4b may occur multiple times before, or while communications 4 is occurring.

Figure 5:
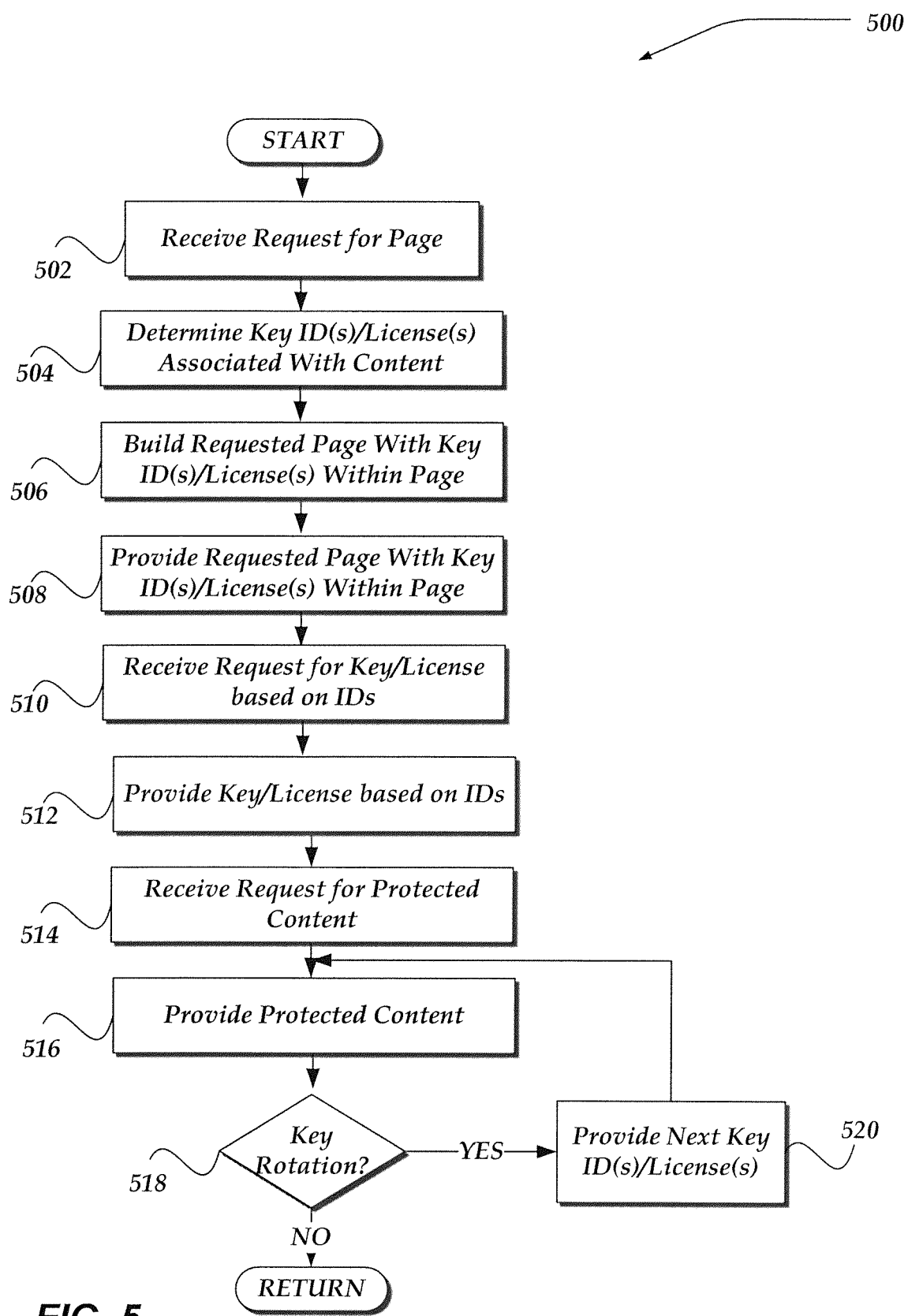
FIG. 5 illustrates a flow chart of one embodiment of a process directed towards reducing the time to decrypting of a first encrypted frame by optimizing a license/key acquisition.

FIG. 5 illustrates a flow chart of one embodiment of a process directed towards reducing the time to decrypting of a first encrypted frame by optimizing a license/key acquisition. Process 500 of FIG. 5 may be performed within CPD 110 of FIG. 1.

Process 500 begins, after a start block, at block 502, where a request for a webpage is received. As discussed above, the request may be to display information about a plurality of different content items, such as might appear on a user page for selecting one of the displayed content items for play. In other embodiments, the request may be for more information about a particular content item, or a request to access a particular content item for play.

Moving to block 504, one or more key identifiers and/or one or more license identifiers are identified with the content in block 502. In some embodiments, the key identifiers might be a single key/license identifier, or a plurality of identifiers for a particular content item, such as might arise for content protected by key rotation schemes. In some embodiments, the identifiers may be directly related to a key/license; however, in other embodiments, the identifiers might instead be a block of data that includes information to identify the content and/or keys.

Flowing next to block 506, a webpage is built to be written in response to the request, where the webpage may include links, tags, scripts, or the like that enable access to the key/license identifiers. Continuing to block 508, the webpage is written to the client device, such that the client device receives the key identifiers/license identifiers and may initiate key/license acquisition processes.

In one embodiment, flowing to block 510, a request is received for one or more keys/licenses. In one embodiment, the request may include the key identifiers/license identifiers. In response, at block 512, the requested one or more keys/licenses are provided. It should be understood, that in some embodiments, blocks 510 and 512 may be performed by another network device other than CPD 110. For example, KMD 114 might perform blocks 510 and 512.

Flowing next to block 514, a request for the content is received. It should be noted that in some embodiments, this request may have been part of the request discussed at block 502. As discussed elsewhere, providing of the protected content may occur parallel with providing keys/licenses to the client device, and/or subsequent to providing keys/licenses to the client device. Thus, blocks 512 and 516 may be concurrent with each other, or as illustrated, block 512 occurring prior to block 516.

Processing flows to decision block 518, where a determination is made whether a key rotation scheme is associated with the content. In one embodiment, keys/licenses associated with key rotation schemes may be provided in the above blocks. However, in some embodiments, the server device, such as CPD 110 might monitor the content playback, and determine when to provide rotated key identifiers/license identifiers. Therefore, if at decision block 518 additional key/license identifiers are to be provided, then processing flows to block 520. Otherwise, processing may return.

Figure 6:
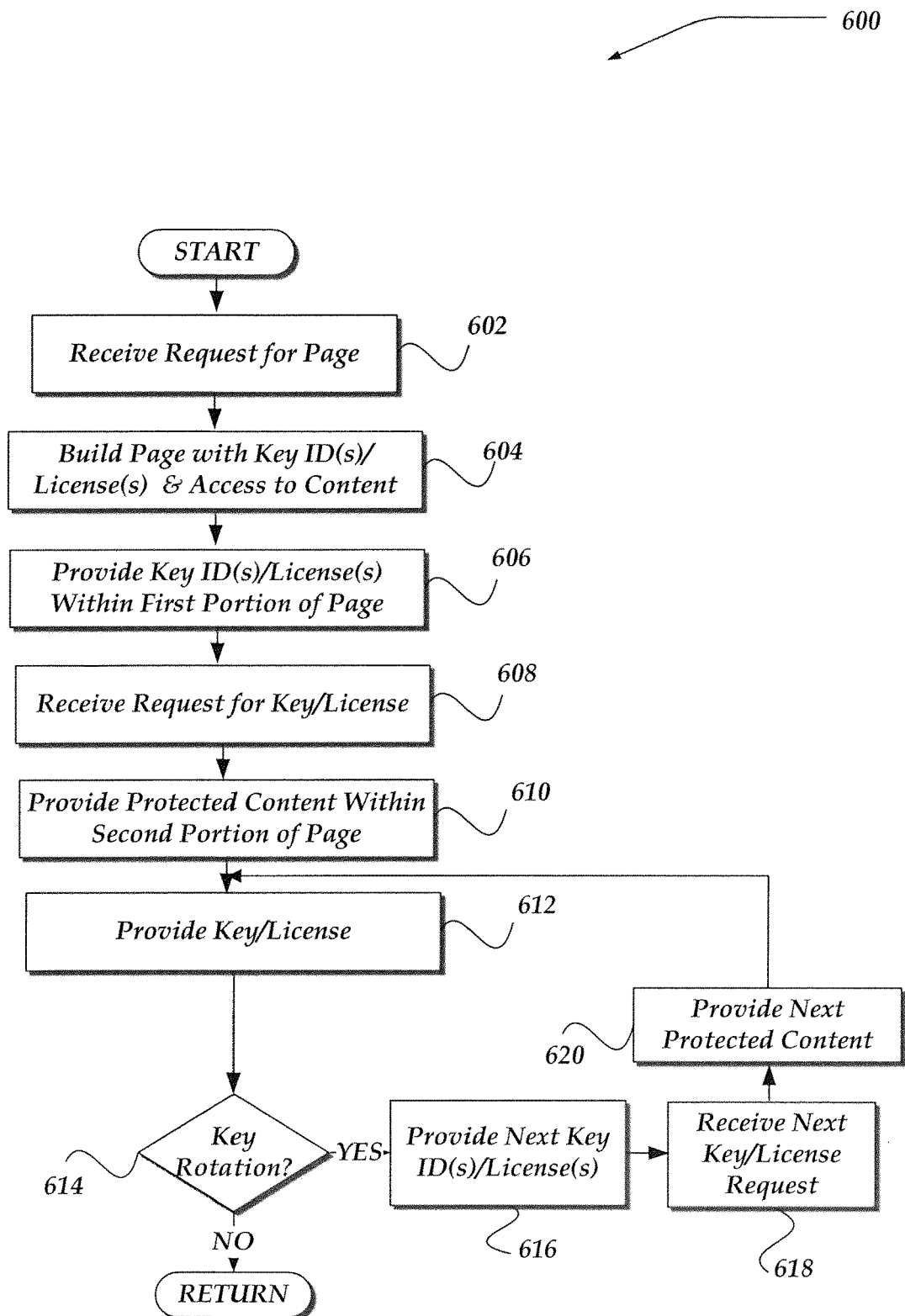
FIG. 6 illustrates a flow chart of another embodiment of a process useable to reduce the time to decrypting of a first encrypted frame.

FIG. 6 illustrates a flow chart of another embodiment of a process useable to reduce the time to decrypting of a first encrypted portion of protected content. At least some of process 600 of FIG. 6 may be performed within CPD 110 and/or KMD 114 of FIG. 1.

Process 600 is similar to process 500, but illustrates the content being provided within a second portion of the requested webpage, and illustrates receiving and responding to key/license requests at least prior to providing at least a portion of the protected content.

Process 600 therefore, begins, after a start block, at block 602, where a request for a webpage is received. As discussed above, the request may be for particular protected content. Moving to block 604, where a response webpage is built that includes key identifiers/license identifiers as discussed above for the requested content. At block 606, the webpage with the embedded identifier information is written to the client device.

Moving to block 608, a request for keys/licenses based on the provided identifiers is received. Moving to block 610, a link or other mechanism useable to access the requested content was embedded in the webpage, and is now provided to the client device. Thus, as may be seen, the key/license acquisition process is again initiated prior to providing at least a portion of the content. Moving to block 612, the requested key/license is provided. It should be noted that in some embodiments, block 612 and 610 may occur concurrently, or be reversed, such that the keys/licenses are provided prior to providing the content.

Moving next to decision block 614, as discussed above, where key rotation schemes are implemented that might not provide multiple keys at block 612, a determination is made whether to provide additional keys/licenses.

If so, processing flows to block 616, where a next key/license identifier(s) are provided. Flowing to block 618, a request may be received for the next key/license based on the provided identifier(s). Moving next to block 620, a corresponding next portion of the content may be provided, concurrent with block 612 of providing the next keys/licenses, or after providing the next keys/licenses.

In some embodiments, for example, based on a seek point, bookmark point, cue point, or the like, an identifier might be provided. However, because the identifier is provided, in some instances, the identifier might not have changed from a previously provided identifier. Thus, in such instances, in some embodiments, a key/license might not be provided using the above actions, even though a next key/license identifier might have been provided.

In any event, at decision block 614 when key rotation is not implemented as discussed, processing may return.

Figure 7:
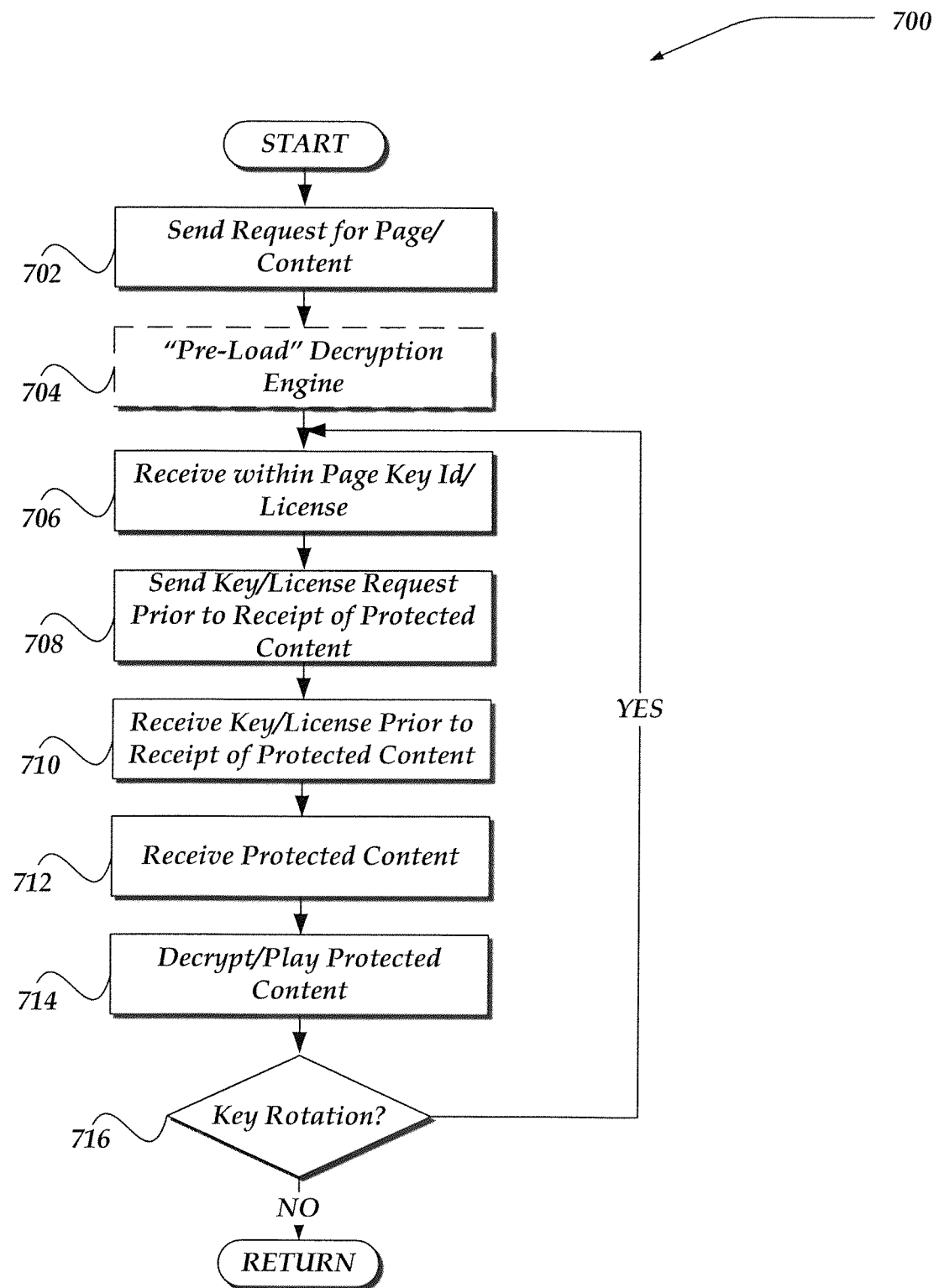
FIG. 7 illustrates a flow chart of one embodiment of a client side process useable to reduce the time to decrypting of a first encrypted frame.

FIG. 7 illustrates a flow chart of one embodiment of a client side process useable to reduce the time to decrypting of a first encrypted frame. Process 700 of FIG. 7 may be implemented within a client device, such as client devices of FIG. 1.

Process 700 begins, after a start block at block 702, where a request for a webpage, and/or content is sent to a content provider. Moving to block 704, in anticipation that the content is protected and will employ decryption and/or license rights, the client device may pre-load and pre-initialize the DRM module and/or other decryption engines, and/or CODECs into memory. This may be achieved using any of a variety of mechanisms including, but not limited, for example, by invoking a dummy or fake object call to the modules to have the operating system pre-load the modules. By pre-loading and pre-initializing the modules, time that might be incurred waiting for the modules is minimized. In one embodiment, block 704 is optional.

Flowing next to block 706 a webpage is received that includes a key/license identifier(s). Receipt of these identifiers may be used by the client device to initiate a key/license acquisition process, such as described above in conjunction with FIG. 4. In some embodiments, where multiple key/license identifiers are received, some may be stored for later use, while one or more may be used to initiate the acquisition process. In some embodiments, the encrypted key/license rather than an identifier may be included in the webpage. In other embodiments the key/license might not be encrypted.

Thus, flowing to block 708, the acquisition process includes sending a request for the key/licenses based on one or more of the received identifiers. Moving to block 710, the requested key/licenses may be received prior to or concurrent with receipt of at least a first portion of the content. Thus, while block 712 describes receiving the content, block 710 may be performed concurrent with block 712 in some embodiments.

Moving to block 714, the received keys/licenses are used to decrypt and otherwise enable play of the received content. Flowing next to decision block 716, a determination is made whether key rotation is implemented. If so, processing may loop back to block 706 to receive additional key/license identifiers; otherwise processing may return.

It should be noted that while the above discussions refer to webpages, other techniques are not so limiting. For example, other communication formats, structures or the like, besides webpages may be used. Thus, webpages illustrate one of many possible mechanisms for communicating identifiers, keys/licenses, and content between networked devices, and others are also envisaged.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system, a cloud system, a multi-server system, or the like. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A network device, comprising:
a memory; and
one or more processors coupled to the memory that perform actions including:
receiving, from a client device, a request for a webpage that includes a link and/or mechanism that can be used to present an encrypted content item;
in response to receiving the request for the webpage, determining that the webpage includes encrypted content and retrieving a key identifier corresponding to the encrypted content item from the memory;
transmitting to the client device a webpage script, corresponding to the request for the webpage, that includes the key identifier corresponding to the encrypted content item and that is configured to cause the client device to transmit a request to a second network device for access to a key associated with the encrypted content item;
subsequent to transmitting the key identifier corresponding to the encrypted content item, receiving, from the client device, an indication of a user selection of the link and/or mechanism and a request for a first encrypted frame of the encrypted content item, the user selection corresponding to the encrypted content item; and
responsive to receiving the indication and the request for the first encrypted frame, transmitting to the client device at least a portion of the encrypted content item including the first encrypted frame, wherein a key associated with the key identifier is usable to decrypt the first encrypted frame.

2. The network device of claim 1, wherein the one or more processors perform actions further including:
transmitting to the client device a subsequent key identifier that corresponds to a subsequent portion of the encrypted content item, wherein the subsequent portion of the encrypted content item is a portion of the encrypted content item that is presented subsequent to a portion of the encrypted content item that corresponds to the key identifier.

3. The network device of claim 1, wherein the webpage script is further configured to cause the client device to pre-initialize at least a decryption module usable to decrypt the encrypted content item.

4. The network device of claim 1, wherein the one or more processors perform actions further including:
determining that the encrypted content item is associated with a key rotation scheme; and
transmitting to the client device a subsequent key identifier based on the key rotation scheme.

5. The network device of claim 1, wherein the one or more processors perform actions further including:
subsequent to transmitting the webpage script to the client device, transmitting at least one portion of the encrypted content item to the client device.

6. The network device of claim 5, wherein the one or more processors perform actions further including:
concurrent with transmitting the at least one portion of the encrypted content item to the client device, transmitting a subsequent key identifier corresponding to a subsequent portion of the encrypted content item, wherein the subsequent portion of the encrypted content item is presented subsequent to the at least one portion of the encrypted content item.

7. A method, comprising:
receiving, from a client device, a request for a webpage that includes a link and/or mechanism that can be used to present an encrypted content item;
in response to receiving the request for the webpage, determining, using a hardware processor, that the webpage includes encrypted content and retrieving a key identifier corresponding to the encrypted content item;
transmitting to the client device a webpage script, corresponding to the request for the webpage, that includes the key identifier corresponding to the encrypted content item and that is configured to cause the client device to transmit a request for access to a key associated with the encrypted content item;
subsequent to transmitting the key identifier corresponding to the encrypted content item, receiving, from the client device, an indication of a user selection of the link and/or mechanism and a request for a first encrypted frame of the encrypted content item, the user selection corresponding to the encrypted content item; and
responsive to receiving the indication and the request for the first encrypted frame, transmitting to the client device at least a portion of the encrypted content item including the first encrypted frame, wherein a key associated with the key identifier is usable to decrypt the first encrypted frame.

8. The method of claim 7, further comprising:
transmitting to the client device a subsequent key identifier that corresponds to a subsequent portion of the encrypted content item, wherein the subsequent portion of the encrypted content item is a portion of the encrypted content item that is presented subsequent to a portion of the encrypted content item that corresponds to the key identifier.

9. The method of claim 7, wherein the webpage script is further configured to cause the client device to pre-initialize at least a decryption module usable to decrypt the encrypted content item.

10. The method of claim 7, further comprising:
determining that the encrypted content item is associated with a key rotation scheme; and
transmitting to the client device a subsequent key identifier based on the key rotation scheme.

11. The method of claim 7, further comprising:
subsequent to transmitting the webpage script to the client device, transmitting at least one portion of the encrypted content item to the client device.

12. The method of claim 11, further comprising:
concurrent with transmitting the at least one portion of the encrypted content item to the client device, transmitting a subsequent key identifier corresponding to a subsequent portion of the encrypted content item, wherein the subsequent portion of the encrypted content item is presented subsequent to the at least one portion of the encrypted content item.

13. A non-transitory computer-readable medium containing computer-executable instructions that, when executed by a processor, cause the processor to perform a method, the method comprising:
receiving, from a client device, a request for a webpage that includes a link and/or mechanism that can be used to present an encrypted content item;
in response to receiving the request for the webpage, determining that the webpage includes encrypted content and retrieving a key identifier corresponding to the encrypted content item;
transmitting to the client device a webpage script, corresponding to the request for the webpage, that includes the key identifier corresponding to the encrypted content item and that is configured to cause the client device to transmit a request for access to a key associated with the encrypted content item;
subsequent to transmitting the key identifier corresponding to the encrypted content item, receiving, from the client device, an indication of a user selection of the link and/or mechanism and a request for a first encrypted frame of the encrypted content item, the user selection corresponding to the encrypted content item; and
responsive to receiving the indication and the request for the first encrypted frame, transmitting to the client device at least a portion of the encrypted content item including the first encrypted frame, wherein a key associated with the key identifier is usable to decrypt the first encrypted frame.

14. The non-transitory computer-readable medium of claim 13, wherein the method further comprises:
transmitting to the client device a subsequent key identifier that corresponds to a subsequent portion of the encrypted content item, wherein the subsequent portion of the encrypted content item is a portion of the encrypted content item that is presented subsequent to a portion of the encrypted content item that corresponds to the key identifier.

15. The non-transitory computer-readable medium of claim 13, wherein the webpage script is further configured to cause the client device to pre-initialize at least a decryption module usable to decrypt the encrypted content item.

16. The non-transitory computer-readable medium of claim 13, wherein the method further comprises:
determining that the encrypted content item is associated with a key rotation scheme; and
transmitting to the client device a subsequent key identifier based on the key rotation scheme.

17. The non-transitory computer-readable medium of claim 13, wherein the method further comprises:
subsequent to transmitting the webpage script to the client device, transmitting at least one portion of the encrypted content item to the client device.

18. The non-transitory computer-readable medium of claim 17, wherein the method further comprises:
concurrent with transmitting the at least one portion of the encrypted content item to the client device, transmitting a subsequent key identifier corresponding to a subsequent portion of the encrypted content item, wherein the subsequent portion of the encrypted content item is presented subsequent to the at least one portion of the encrypted content item.

* * * * *